July 9, 1957
I. E. COFFEY
2,798,999
ELECTRIC MOTOR CONTROL FOR WINDSHIELD WIPERS
Filed Aug. 23, 1951
4 Sheets-Sheet 1
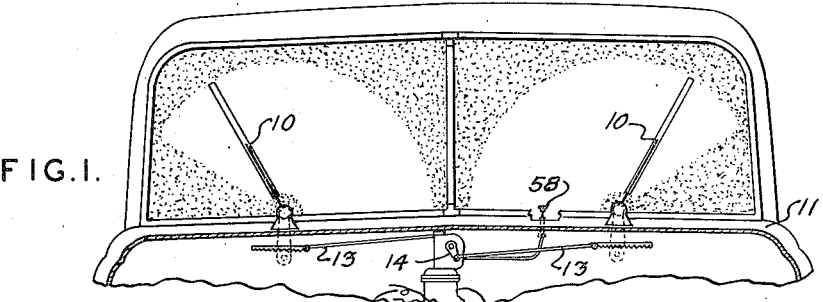
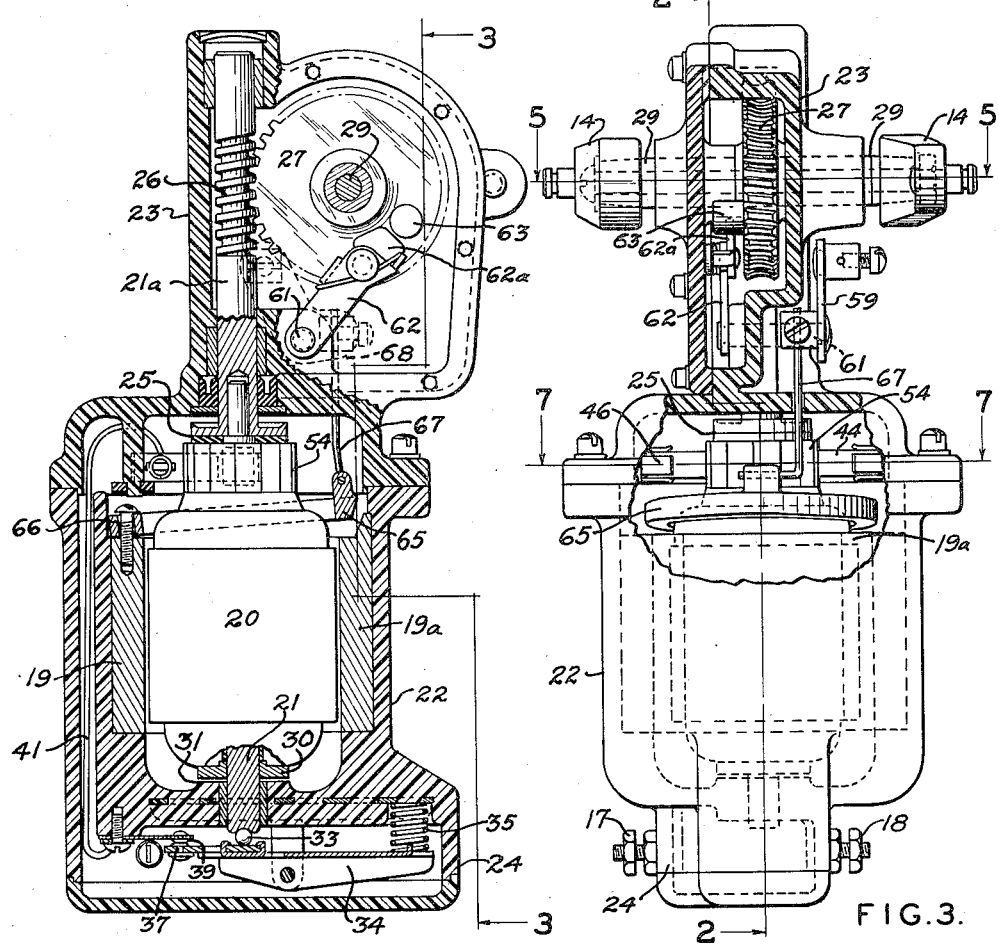
INVENTOR.
IRVEN E. COFFEY
BY George A. Ericson
ATTORNEY INVENTOR.
IRVEN E. COFFEY
BY George A. Ericson
ATTORNEY

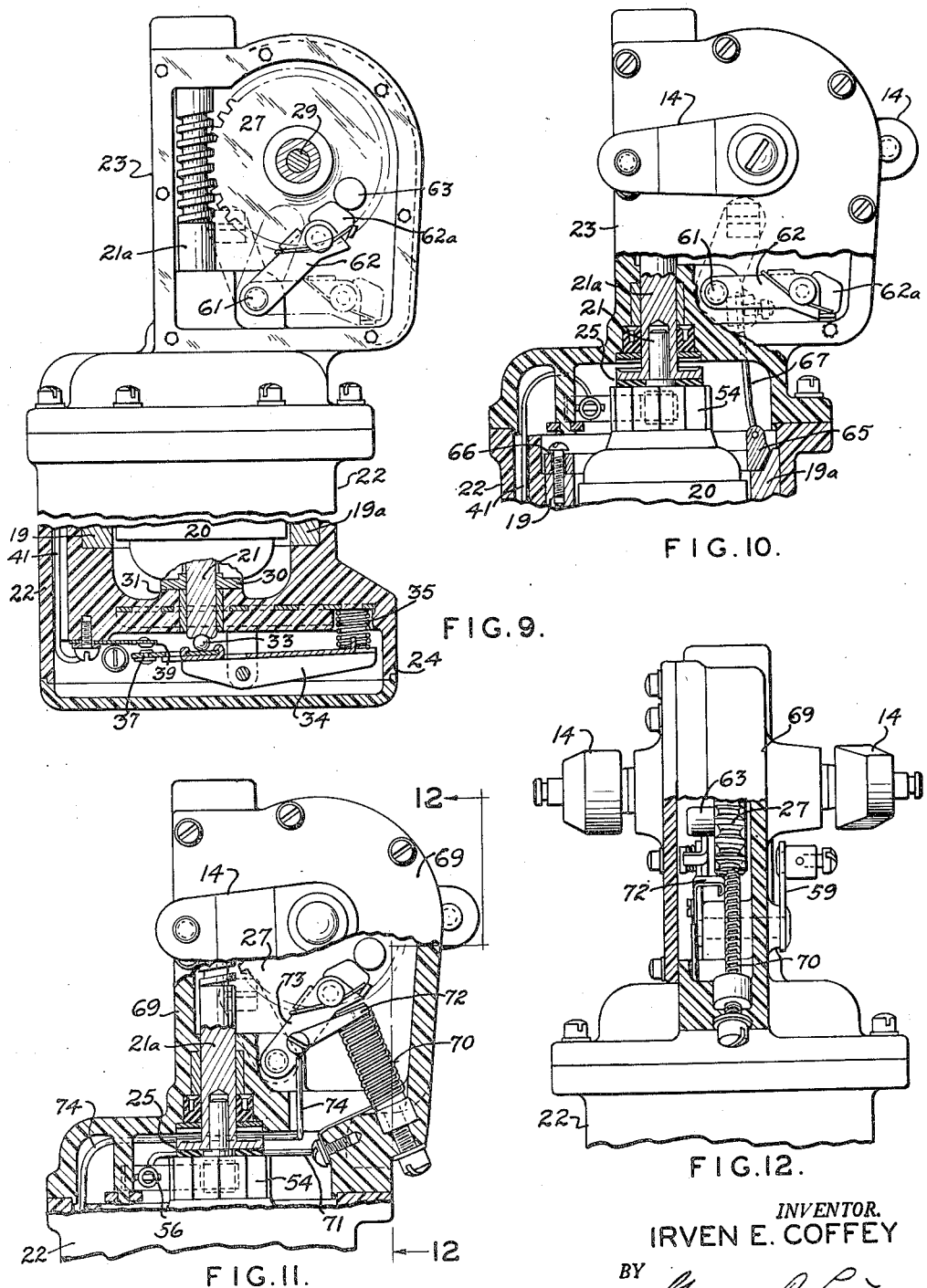

July 9, 1957   I. E. COFFEY   2,798,999
ELECTRIC MOTOR CONTROL FOR WINDSHIELD WIPERS
Filed Aug. 23, 1951   4 Sheets-Sheet 4

INVENTOR.
IRVEN E. COFFEY
BY
Bertram H. Mann

ATTORNEY

United States Patent Office 2,798,999
Patented July 9, 1957

2,798,999

ELECTRIC MOTOR CONTROL FOR WINDSHIELD WIPERS

Irven E. Coffey, Clayton, Mo.; Mercantile Trust Company, executor of the estate of said Irven E. Coffey, deceased, assignor to ACF Industries, Incorporated, New York, N. Y., a corporation of New Jersey Application August 23, 1951, Serial No. 243,266

15 Claims. (Cl. 318—475)

This invention relates to windshield wiper driving and controlling devices, and more particularly to starting, stopping, and speed control means therefor.

The most common form of windshield wiper is powered by suction taken from the engine manifold. Although such windshield wipers function satisfactorily during periods of high manifold suction, during periods of low manifold suction, such as during acceleration, they are rendered inoperative due to the absence of manifold suction.

For this reason it has been found advantageous to use some other motive power, such as electricity, for windshield wipers. In order to insure that the blades be parked out of the driver's way when not in use, it is necessary to provide electric windshield wiper motors with a positive stop, so that the wipers will always come to rest at the proper parking positions. Electric motors become overheated and damaged if the wiper blades become blocked because of freezing or for any other reason unless means are provided to automatically shut the motor off when blocking occurs. Since it is desirable not to run windshield wipers at the same speed at all times, variable speed control means are necessary.

Accordingly it is an object of this invention to provide manually controlled means for parking the blades outside of the operator's range of vision.

It is a further object of this invention to provide means associated with said first named means for varying the speed of the motor.

A further object of this invention is to provide a novel brush mounting whereby wear on brushes may be minimized and their life increased.

Another object object is to provide a simple, inexpensive, and dependable windshield wiper driving and control device.

These objects and other more detailed objects hereinafter appearing are attained substantially by an electric motor having a worm and gear transmission. For starting, stopping, and parking, means are provided for manually blocking the worm gear, whereby the armature shaft is shifted axially to open or close a switch controlling the motor circuit. In one form of my invention, speed is varied by a magnetic shunt controlled by the means associated with parking mechanism, while in a modified form, speed is varied by a rheostat in the motor circuit, likewise controlled by means associated with the parking mechanism.

In the accompanying drawings:

Fig. 1 is a front view of an automobile body and windshield having a pair of wipers and the novel motor and control applied thereto.

Fig. 2 is a transverse vertical section of the motor and control means therefor taken along the line 2—2 of Fig. 3.

Fig. 3 is a fragmentary section taken along the line 3—3 of Fig. 2.

Fig. 9 is a partial vertical section showing control means located in the base of the casing.

Fig. 10 is a partial vertical section showing the speed control means of Figs. 2 and 3 in the maximum speed position.

Fig. 11 is a partial vertical section of the upper portion of the motor housing, showing a modified form of speed control means.

Fig. 12 is a vertical section along the line 12—12 of Fig. 11.

Figure 4:
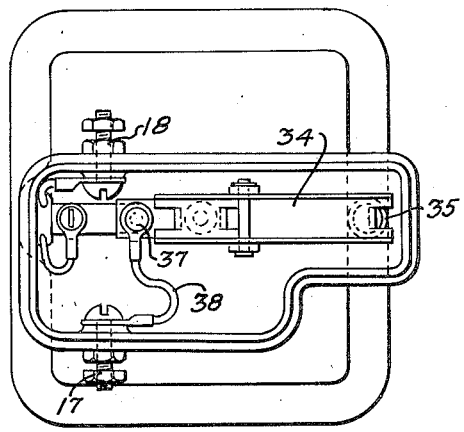
Fig. 4 is a bottom view of the device with the bottom cover removed.
Figure 5:
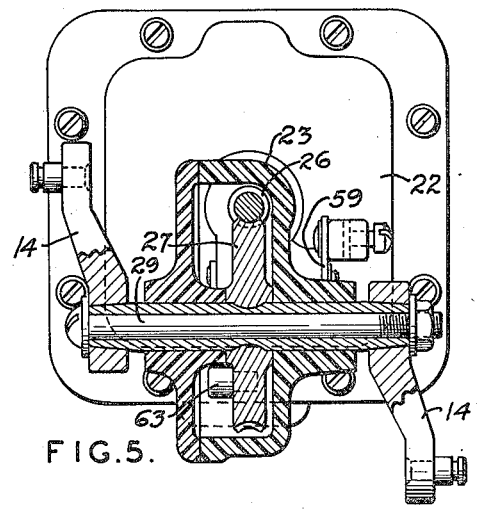
Fig. 5 is a plan view and partial sectional view along the line 5—5 of Fig. 3.
Figure 6:
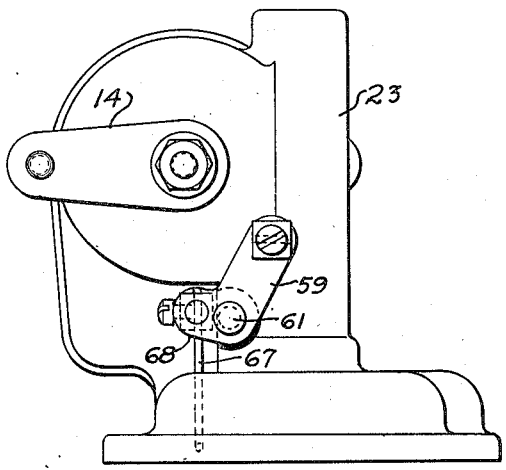
Fig. 6 is an external view of the cover portion of the motor casing.

Referring to the drawings,

Fig. 1 shows a pair of windshield wipers 10 mounted on the cowl portion 11 of an automobile and connected to an electric motor 12 mounted beneath the cowl, by transmission means including links 13 and cranks 14. Wiring 15 connects motor terminals 17 and 18 to the automobile battery or other power source.

The motor 12 includes a permanently magnetized field having pole pieces 19 and 19a and an armature 20 mounted on shaft 21, the entire assembly being housed in a casing 22 formed with an upwardly projecting flat portion 23 and a narrow downwardly projecting portion 24. A shaft 21a concentric with, and frictionally secured to, armature 20 by clutch 25, extends upwardly into casing portion 23, in which it is suitably journalled, and is formed with a worm 26 which engages a worm gear 27. The purpose of clutch 25 is to permit slippage between shaft 21a and the armature when shaft 21a is stopped while the armature is rotating, in a manner which will be described below. Worm gear 27 is rigidly mounted on an axle 29 which is journalled in suitable bearings in the wall structure of casing portion 23, and a crank 14 is rigidly secured to each end of the axle, so that rotary movement of the armature may be transmitted via gear 27, cranks 14 and links 13 to the windshield wipers. Armature 20 and shaft 21 are capable of a slight axial shifting, the purpose of which will be described below. The bottom of the armature is provide with a plate 30 adapted to frictionally engage a cooperating flat portion 31 of the casing interior surface for the purpose of braking the armature when it is shifted to the lowermost position. The lower end portion of shaft 21 is formed with a spherical depression to receive and rest upon ball 33 which in turn rests upon spring loaded lever 34, so that the armature 20 and shaft 21 are normally urged upwardly due to the action of spring 35 and lever 34. Lever 34 is formed with a contact point 37 at one end, which is connected by lead 38 with terminal 17. A cooperating contact point 39 is secured to the insulating casing structure above contact point 37, so that when spring 35 and lever 34 urge shaft 21 to its uppermost position points 37 and 39 will contact, but when shaft 21 is in its lowermost position points 37 and 39 will be separated. A wire 41 connects contact point 39 to one of the motor brushes, and another wire 42 connects terminal 18 directly to the other brush.

The brush structure will now be described in detail. Brushes 44 are carried by stamped sheet metal arms 45 having ears 46 at one end forming box-like cups, and right angle extensions 48 at the other end. Extensions 48 are pivoted in V-slots at the ends of insulating member 50, which depends from and is integral with the cover portion of casing 22. A coil spring 52 connected at its extremities with insulating members 53 urges arms 45 toward each other, thereby retaining extensions 48 in the V-slots of member 50, and urging brushes 44 into constant contact with commutator 54. Insulating members 53 are flat, oval members, each having two holes, through one of which passes an extremity of coil spring 52. Skinned extremities 56 of wires 41 and 42 are fitted into the other holes so as to pivotally secure arms 45 to insulating members 53. By arranging the brushes in this manner, on relatively long pivoting arms, a substantially constant relationship is maintained between the contact face of the brushes and the commutator, thus equalizing wear on the brushes and providing better contact between the brushes and the commutator. Insulating bosses 57 depending from the cover of casing 22 serve as stops to prevent engagement of arms 45 with commutator 54 when brushes 44 are nearly worn out.

For starting and stopping and regulating the speed of the motor a manually operable button 58 is provided on the dash of the automobile. Button 58 is connected by a flexible cable to bell crank 59 which is mounted on a shaft 61 suitably journalled in the wall structure of upper casing portion 23 below worm gear 27. A second arm 62 is rigidly secured to the opposite end of shaft 61 and has at its free end a pivoted, spring loaded contact member 62a adapted to engage a lug 63 on worm gear 27 so that when arm 62 is in position to engage lug 63, worm gear 27 will be halted in its clockwise movement thereby causing shaft 21 to move downwardly, thus urging lever 34 downwardly and separating points 37 and 39. The arrangement of arm 62 and lug 63 with respect to the transmission elements is such that the arm only blocks the lug, thereby stopping the wipers, when the wipers are in the desired parking position, outside of the driver's normal area of vision. As soon as arm 62 is rotated out of engagement with lug 63, shaft 21 will be free to move upwardly, so that spring 35 may urge lever 34 and shaft 21 upwardly, thereby causing contact points 37 and 39 to engage, thus energizing the armature circuit of the motor.

Figure 7:
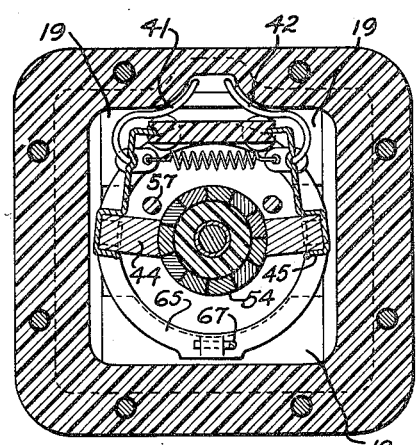
Fig. 7 is a horizontal sectional view along the line 7—7 of Fig. 3 showing the brush mounting.
Figure 8:
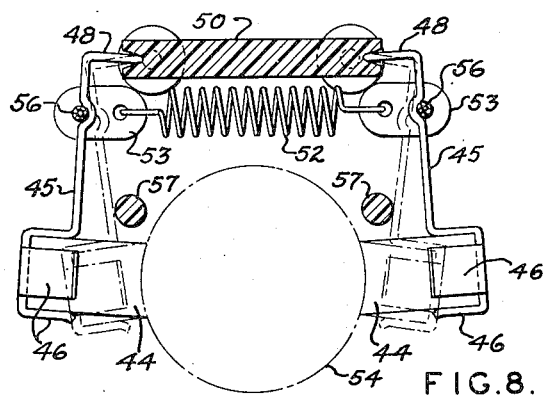
Fig. 8 is an enlarged horizontal sectional view of the brush mounting.
Figure 13:
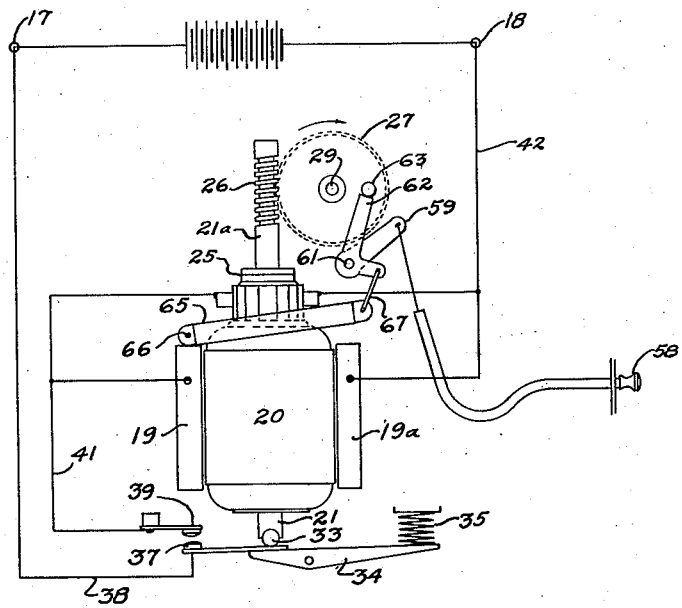
Fig. 13 is a diagrammatic view illustrating the mechanical parts and wiring arrangement of the form of the invention shown in Figs. 1 to 10.
Figure 14:
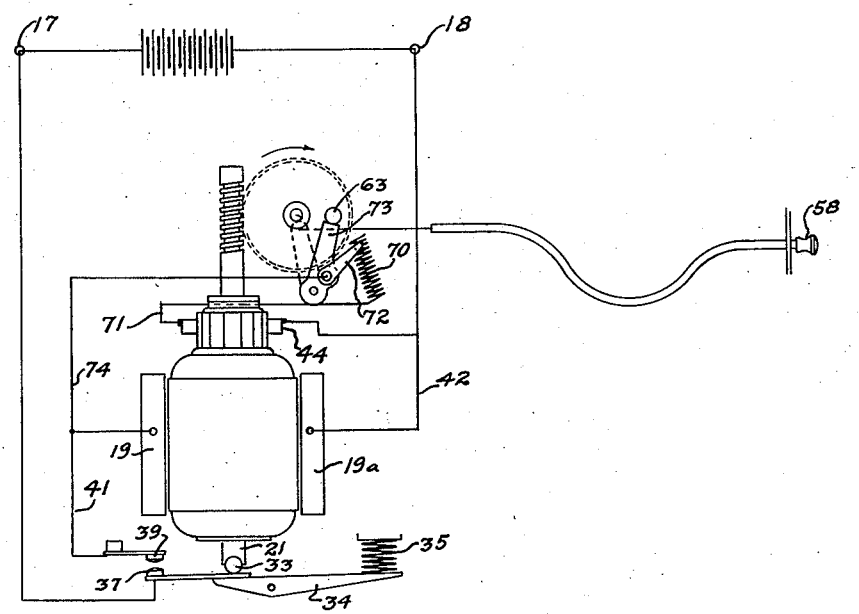
Fig. 14 is a diagrammatic view illustrating the parts and wiring arrangement of the form of the invention shown in Figs. 11 and 12.

In the form of my invention illustrated in Figs. 2, 3, 7 and 10 I provide a speed regulating means for use in conjunction with the above described starting and stopping means which comprises an annular magnetic shunt member 65 loosely secured as at 66 to the upper surface of field pole piece 19, so that it can be raised from and lowered into contact with the upper surface of field pole piece 19a, thereby to vary the air gap between the shunt member and pole piece 19a. Depending upon the proximity of member 65 to field member 19a, varying portions of the magnetic flux are shunted through member 65 instead of passing across the armature, thereby varying the speed of the motor accordingly. Annular member 65 is connected by a link 67 to an arm 68 of bell crank 59, so that as bell crank 59 is rotated towards or away from the stop position, annular member 65 is, respectively, raised or lowered, thereby increasing or decreasing the speed of armature 20 and shaft 21. Thus by merely moving button 58 the operator may start, stop, and vary the speed of the windshield wipers.

Operation of the device of Figs. 2, 3 and 10 is as follows:

When button 58 is moved to the "off" position, contact member 62a of arm 62 engages lug 63 of worm gear 27, thereby parking the wipers, and shafts 21a and 21 are shifted to their lowermost position, thereby separating contact points 37 and 39, so that the armature circuit is opened. During the slight interval between the stoppage of shaft 21a, and the separation of points 37 and 39, slippage in clutch 25 permits slight rotation of the armature, thus preventing damage to the motor. When the armature is shifted to its lowermost position braking members 30, 31 become engaged, thus preventing further rotation of the armature. When the operator moves button 58 to the starting position, contact member 62a of arm 62 is moved out of engagement with lug 63 of the worm gear. Since the worm gear is free to rotate, shaft 21 is likewise free to shift upwardly due to the pressure of spring 35. Upward shifting of shaft 21 separates braking elements 30 and 31 and permits engagement of contact points 37 and 39, thereby closing the armature circuit and starting the motor. Further movement of button 58 causes additional downward movement of member 65, thereby increasing the speed of the armature until the maximum speed is reached, when member 65 is in its lowermost position, in full contact with field pole piece 19a. To reduce the speed of the motor, the operator merely moves button 58 in the opposite direction, thereby raising member 65. During operation of the wipers, if they strike some obstruction, such as ice on the windshield, rotation of worm gear 27 would be halted, causing downward shifting of shaft 21, with consequent instantaneous separation of contact points 37 and 39, thereby breaking the armature circuit and preventing damage to the motor.

A modification of the invention is shown in Figs. 11 and 12. The modification of Figs. 11 and 12 is identical to the structure heretofore described except for the elimination of the speed control means shown in Figs. 2, 3, and 10 and the substitution of a different type of speed control means therefor. In this modification the upper portion 69 of the motor casing is formed to include a small variable rheostat coil 70, one end of which is connected by wire 71 to brush terminal 56. A contactor 72 is mounted on arm 73 which otherwise corresponds to arm 62 of the original modification. Contactor 72 is connected at one end by wire 74 to contact point 39, and at its other end is formed with a contacting lip for slidable engagement with the winding of rheostat 70, so that as arm 73 is rotated from the stop position the resistance is decreased and the speed of the motor is thereby increased.

Operation of the device of Figs. 11 and 12 is in all respects the same as the operation of the modification shown in Figs. 2 and 3 except if the operator desires to vary the speed. In such case, as the operator moves control button 58 upwardly or downwardly, arm 73 and contactor 72 are rotated, so that contactor 72 moves up or down on rheostat 70, thereby varying the voltage applied to armature 20 and the speed of rotation of the armature.

The invention may be modified as will occur to those skilled in the art and exclusive use is contemplated of all embodiments as fall within the scope of the appended claims.

I claim:

1. In a windshield wiper, an electric motor, a control switch for energizing said motor, meshing driving and driven gears, said driving gear being mounted for displacement from its operative position when the driven gear is stopped, said driving gear having an abutment in engagement with said control switch for opening said switch and breaking the motor circuit when said driving gear is displaced, and manually actuable means for stopping said driven gear.

2. In a windshield wiper, an electric motor, a control switch for energizing said motor, meshing driving and driven gears, said driving gear being mounted for displacement from its operative position when the driven gear is stopped, said driving gear having an abutment in engagement with said control switch for opening said switch and breaking the motor circuit when said driving gear is displaced, manually actuable means for stopping said driven gear, and means associated with said manually actuable means for varying the speed of said motor.

3. In a windshield wiper, an electric motor, a transmission including an element mounted for displacement from its operative position when the transmission is stopped, a control switch for energizing said motor, an operative connection between said element and said control switch for opening said switch responsive to displacement of said element, and manually actuable means for stopping the transmission at a predetermined position.

4. In a windshield wiper, an electric motor, a transmission including an element mounted for displacement from its operative position when the transmission is stopped, a control switch for energizing said motor, an operative connection between said element and said control switch for opening said switch responsive to displacement of said element, and manually actuable means for stopping the transmission at a predetermined position, and means associated with said manually actuable means for varying the speed of the motor.

5. In an apparatus for operating a windshield wiper, an electric motor having an armature fixed on a shaft journaled for slight axial movement, a worm operatively connected to the armature shaft, a worm gear in meshing engagement with said worm and operatively connected to the wiper, a pivoted lever engaging one end of said shaft, resilient means urging said lever in the direction to maintain said worm in normal meshing engagement with said gear, a switch controlled by said lever for energizing said motor whereby upon axial shifting of said armature shaft due to stopping of said gear said switch is opened and the armature stopped, and manually actuable means for stopping said gear at a predetermined position.

6. In an apparatus for operating a windshield wiper, an electric motor having an armature fixed on a shaft journaled for slight axial movement, a worm operatively connected to the armature shaft, a worm gear in meshing engagement with said warm and operatively connected to the wiper, a pivoted lever engaging one end of said shaft, resilient means urging said lever in a direction to maintain said worm in normal meshing engagement with said gear, a switch controlled by said lever for energizing said motor whereby upon axial shifting of said armature shaft due to stopping of said gear said switch is opened and the armature stopped, manually actuable means for stopping said gear at a predetermined position, and means associated with said manually actuable means for varying the speed of said motor.

7. In a windshield wiper, an electric motor including an armature and means forming a magnetic field therefor, a control switch for energizing said motor, a transmission including means responsive to stoppage of said transmission for automatically opening said control switch, an adjustable magnetic shunt associated with said field for diverting varying portions of the flux from the armature, and manually actuable means for stopping said transmission and for adjusting said magnetic shunt member.

8. In a windshield wiper, an electric motor including an armature and means forming a magnetic field, a control switch for said motor, meshing driving and driven gears, said driving gear being mounted for displacement from its operative position when the driven gear is stopped and having an abutment in engagement with said control switch for opening said switch and breaking the motor circuit when said driving gear is displaced, an adjustable magnetic shunt associated with said field for diverting variable portions of the flux from the armature, and manually actuable means for stopping said transmission and for adjusting said magnetic shunt member.

9. In a windshield wiper, an electric motor including an armature and means forming a magnetic field, an adjustable magnetic shunt for diverting variable portions of the flux from said armature, a transmission including an element mounted for displacement from its operative position when the transmission is stopped, a control switch for energizing said motor, an operative connection between said element and said control switch for opening said switch responsive to displacement of said element, and manually actuable means for adjusting said magnetic shunt member and for stopping said transmission.

10. In an apparatus for operating a windshield wiper, an electric motor having an armature fixed on a shaft mounted for slight axial movement and means forming a magnetic field, an adjustable magnetic shunt member for diverting variable portions of the flux from said armature, a worm operatively connected to the armature shaft, a worm gear in meshing engagement with said worm and in operative connection with the wiper, a pivoted lever engaging one end of said shaft, resilient means urging said lever in a direction to maintain said worm in normal engagement with said gear, a switch controlled by said lever for energizing said motor whereby upon axial shifting of said armature shaft due to stopping of said gear said switch is opened and the armature stopped, and manually actuable means for adjusting said shunt member and for stopping said gear at a predetermined position.

11. In a windshield wiper, an electric motor having a circuit, a control switch in said circuit for energizing said motor, a variable resistance in the motor circuit, a transmission including means responsive to stoppage of the transmission for automatically opening said control switch, and manually actuable means for varying said resistance and for stopping said transmission.

12. In a windshield wiper, an electric motor having a circuit, a control switch in said circuit for energizing said motor, a variable resistance in the motor circuit, meshing driving and driven gears, said driving gear being mounted for displacement from its operative position when the driven gear is stopped and having an abutment in engagement with said control switch for opening said switch and breaking the motor circuit when said driving gear is displaced, and manually actuable means for varying said resistance and for stopping said driven gear.

13. In a windshield wiper, an electric motor, having a circuit, a control switch in said circuit for energizing said motor, a variable resistance in said motor circuit, a transmission including an element mounted for displacement from its operative position when the transmission is stopped, an operative connection between said element and said control switch for opening said switch responsive to displacement of said element, and manually actuable means for varying said resistance and for stopping said transmission.

14. In an apparatus for operating a windshield wiper, an electric motor having a circuit and an armature fixed on a shaft mounted for slight axial movement, a variable resistance in the motor circuit, a worm operatively connected to the armature shaft, a worm gear in meshing engagement with said worm and operatively connected to the wiper, a pivoted lever engaging one end of said shaft, resilient means urging said lever in a direction to maintain said worm in normal meshing engagement with said gear, a switch in said circuit controlled by said lever for energizing said motor whereby, upon axial shifting of said armature shaft due to stopping of said gear, said switch is opened and the armature de-energized, and manually actuable means for varying said resistance and for stopping said gear.

15. In an apparatus for operating a windshield wiper, an electric motor having an armature fixed on a shaft mounted for slight axial movement, a worm, a clutch frictionally securing said worm to the armature shaft, a worm gear in meshing engagement with said worm and operatively connected with the wiper, cooperating faces on said armature and a stationary portion of said motor adapted for frictional engagement, a pivoted lever engaging one end of the armature shaft, resilient means urging said lever in a direction to maintain said worm in normal meshing engagement with said gear and to separate said cooperating faces, a switch controlled by said lever for energizing said motor whereby upon axial shifting of said armature shaft due to stopping of said gear said switch is opened and said cooperating faces are engaged to stop the armature, and manually actuable means for stopping said gear comprising a lug on said gear and a manually actuable stop member arranged for engagement with said lug.

References Cited in the file of this patent

UNITED STATES PATENTS

| | | |
|---|---|---|
| 1,871,987 | Hardman | Aug. 16, 1932 |
| 1,983,799 | Harrison | Dec. 11, 1934 |
| 2,419,169 | Sheaks et al. | Apr. 15, 1947 |
| 2,452,178 | Brownlee | Oct. 26, 1948 |
| 2,459,479 | Weinland | Jan. 18, 1949 |
| 2,464,847 | Coffey | Mar. 22, 1949 |
| 2,484,781 | Coffey | Oct. 11, 1949 |
| 2,514,694 | Chapman | July 11, 1950 |
| 2,517,373 | Ambrose | Aug. 1, 1950 |